United States Patent [19]

Nevis

[11] Patent Number: 6,097,849
[45] Date of Patent: Aug. 1, 2000

[54] AUTOMATED IMAGE ENHANCEMENT FOR LASER LINE SCAN DATA

[75] Inventor: Andrew J. Nevis, Panama City, Fla.

[73] Assignee: The United States of America as represented by the Secretary of the Navy, Washington, D.C.

[21] Appl. No.: 09/135,317

[22] Filed: Aug. 10, 1998

[51] Int. Cl.[7] .................................. G06T 5/40; G06T 5/50
[52] U.S. Cl. ........................................... 382/274; 382/168
[58] Field of Search .................................. 382/274, 254, 382/270, 169, 172, 168, 266

[56] References Cited

U.S. PATENT DOCUMENTS

| 5,093,871 | 3/1992 | Klein et al. | 382/172 |
|---|---|---|---|
| 5,710,842 | 1/1998 | Lee | 382/254 |
| 5,995,656 | 11/1999 | Kim | 382/169 |

*Primary Examiner*—Scott Rogers
*Attorney, Agent, or Firm*—Harvey A. Gilbert; Donald G. Peck

[57] ABSTRACT

To produce an enhanced image, the contrast of the image is first measured by computing a central histogram moment. The image is scaled at each pixel thereof based on the central histogram moment and the maximum value of the image's dynamic range resulting in the generation of a scaled image. An estimate of the image background is subtracted from the scaled image to produce a low contrast enhancement value and added to the scaled image to produce a high contrast enhancement value. A portion of the low contrast enhancement value is summed with a complimentary portion of the high contrast enhancement value to generate an enhanced image intensity at each pixel.

22 Claims, 1 Drawing Sheet

AUTOMATED IMAGE ENHANCEMENT FOR LASER LINE SCAN DATA

ORIGIN OF THE INVENTION

The invention described herein was made in the performance of official duties by an employee of the Department of the Navy and may be manufactured, used, licensed by or for the Government for any governmental purpose without payment of any royalties thereon.

CROSS-REFERENCED TO RELATED PATENT APPLICATIONS

This patent application is co-pending with two related patent applications entitled "BACKGROUND EQUALIZATION FOR LASER LINE SCAN DATA," Ser. No. 09/066793 (Navy Case No. 78624) and "LINE CONTRAST DIFFERENCE EFFECT CORRECTION FOR LASER LINE SCAN DATA," Ser. No. 09/066707 (Navy Case No. 78581) by the same inventor as this patent application.

FIELD OF THE INVENTION

The invention relates generally to image enhancement, and more particularly to an automated image enhancement method for improving image quality of laser line scan data.

BACKGROUND OF THE INVENTION

The electro-optic identification (EOID) sensor is used in underwater vehicles for remote identification of proud (i.e., standing clear on the sea bottom), partially buried, and moored mines in the shallow water and very shallow water regions. EOID sensing is based upon laser line scan (LLS) technology that produces images by synchronously scanning a narrow beam and a narrow field-of-view (FOV) receiver across the sea bottom. In general, LLS technology reduces the detrimental effects of backscatter and blur/glow/forward scatter to produce underwater images of excellent resolution, contrast and range. However, since identification algorithms for EOID data are beyond current technology, mine identification is conducted by manual inspection of EOID imagery as data is collected. Consequently, electro-optic image enhancement techniques are needed to improve EOID image quality so that mines can be reliably and more easily distinguished from associated clutter especially in turbid coastal water conditions.

Furthermore, laser line scan imagery can have fluctuating brightness or contrast regions due to high/low signal strength variations when scanning data. High signal strength regions occur when the EOID sensor is perpendicular to a reflective surface (i.e., sea bottom) where photons travel the shortest distance resulting in less scattering effects. Low signal strength regions occur at off-angle scan-lines and sudden drops of elevations in the reflective surfaces where photons must travel further resulting in more scattering effects. The low signal strength regions can obscure visibility of image details thereby allowing objects to "hide" within image shadows.

One image enhancement technique used to enhance high/low signal strength regions is disclosed in the above-referenced co-pending patent application entitled "Background Equalization for Laser Line Scan Data." However, this technique is not capable of operating as an automated image enhancement process because parameters used by the process are sensitive to the environmental conditions of the image and must be supplied by user interaction. Also, the background equalization routine sometimes introduces a smudge effect with high contrast objects. While these high contrast objects are still visible after enhancement, the smudge effect is aesthetically displeasing and can slightly alter the original geometric shape of the imaged object.

SUMMARY OF THE INVENTION

Accordingly, it is an object of the present invention to provide a method of enhancing electro-optic image data.

Another object of the present invention is to provide a method of enhancing laser line scan image data.

Still another object of the present invention is to provide a method of enhancing both high and low signal strength regions of electro-optic image data.

Yet another object of the present invention is to provide a method of automatic image enhancement of electro-optic image data that adapts to environmental conditions of the image.

Other objects and advantages of the present invention will become more obvious hereinafter in the specification and drawings.

In accordance with the present invention, an enhanced image is produced. The contrast of the image is measured by computing a central histogram moment $I_{MOM}$ defined as $$I_{MOM} = \sum_{k=0}^{I_{MAX}} H(k) \times \left(k - \frac{1}{2} I_{MAX}\right)$$

where $H(k)$ is an image histogram of the image and $I_{MAX}$ is a maximum value of the dynamic range of the image. The image is scaled at each pixel thereof based on the central histogram moment $I_{MOM}$ and the maximum value $I_{MAX}$ resulting in the generation of a scaled image at each pixel. The image background is estimated at each pixel of the image. The image background is subtracted from the scaled image at each pixel to produce a low contrast enhancement value associated with each pixel. The image background is also added to the scaled image at each pixel to produce a high contrast enhancement value associated with each pixel. Finally, a first portion of the low contrast enhancement value is summed with a second portion of the high contrast enhancement value to generate an enhanced image intensity at each pixel.

DETAILED DESCRIPTION OF THE INVENTION

Figure 1:
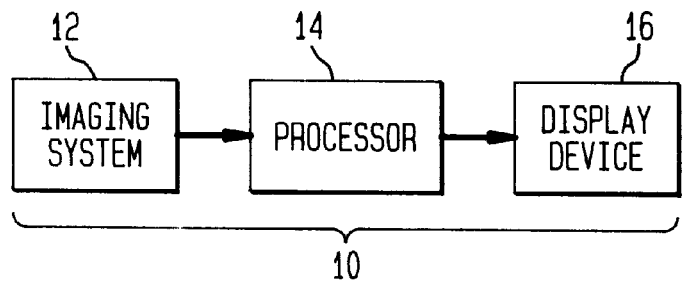
FIG. 1 is a block diagram of a system used to carry out the method of the present invention.

The automated image enhancement of the present invention is an improvement of the background equalization process described in the above-referenced co-pending patent application. Accordingly, a brief overview of the process described therein will first be presented below and then the improvements provided by the present invention will be described. By way of illustrative example, the description will focus on an image produced using laser line scan (LLS) data. However, the present invention can be used to automatically enhance any image in which image contrast fluctuations due to high/low signal strength variations reduce image clarity.

Inspection of images based on LLS data revealed high/low signal strength variations throughout the imagery. It was found that the high signal strength regions suppressed information in the low signal strength regions thereby causing objects to be obscured. Typical enhancement routines were ineffective in enhancing objects obscured in low signal strength regions without causing deleterious effects on other objects already visible in the high signal strength regions. It was for this reason that the background equalization enhancement process of the co-pending application was developed. The concept was to equalize the image background making high and low signal strength regions more uniform. However, as mentioned above, the drawbacks are that it cannot be implemented as a fully automated process and that it sometimes leaves a smudge effect around high contrast objects.

The approach of the background equalization process disclosed in the co-pending application is to use an estimate of the image background in order to remove intensity variations to make the image more uniform. This is accomplished by using a least squares error estimate of the image with overlapping linear piecewise line segments on the image rows and columns. Using piecewise line segments allows flexibility in changing regions of the background, while the overlapping technique helps reduce edge effects where the line segments connect. Once the background estimate is computed, the high/low signal strength regions are equalized by subtracting the background estimate from the actual image. The "resultant" image is then rescaled to full dynamic range and has a histogram clipping routine applied to remove any artifact noise that may have been inadvertently generated.

The two obstacles that prevent the method of the co-pending background equalization application from being automated are the use of user-specified piecewise line segments (used in the least squares error estimates) and the use of fixed threshold values for the histogram clip. The length of the piecewise line segments is dependent on the expected object size. In general, small line segments do not accurately represent large objects, while larger line segments increase the smudge effect around high contrast objects. Thus, the wrong choice of line segment length can reduce the quality of an object's image.

In addition, since the images will change as new areas are being scanned, the fixed threshold value histogram clip can affect image enhancement. For example, some images contain significant noise at both ends of the dynamic range and therefore require histogram clipping to remove the noise so that the full dynamic range of the image can be obtained. Other images, however, are relatively noise free and can contain brightly reflecting objects. The pixel values of the brightly reflecting objects overlap with noise pixels in the upper region of the dynamic range. Histogram clipping this type of image using the same threshold value as used for noisy images can cause a saturating effect. While most images show significant improvement from the fixed parameter choices used in the background equalization enhancement process, it is possible that on rare occasions some objects in the images may be distorted beyond identification which is not acceptable for automated enhancement. Thus, the line segment size and the histogram clipping threshold dilemmas prevent the background equalization process from being fully automated.

Figure 2:
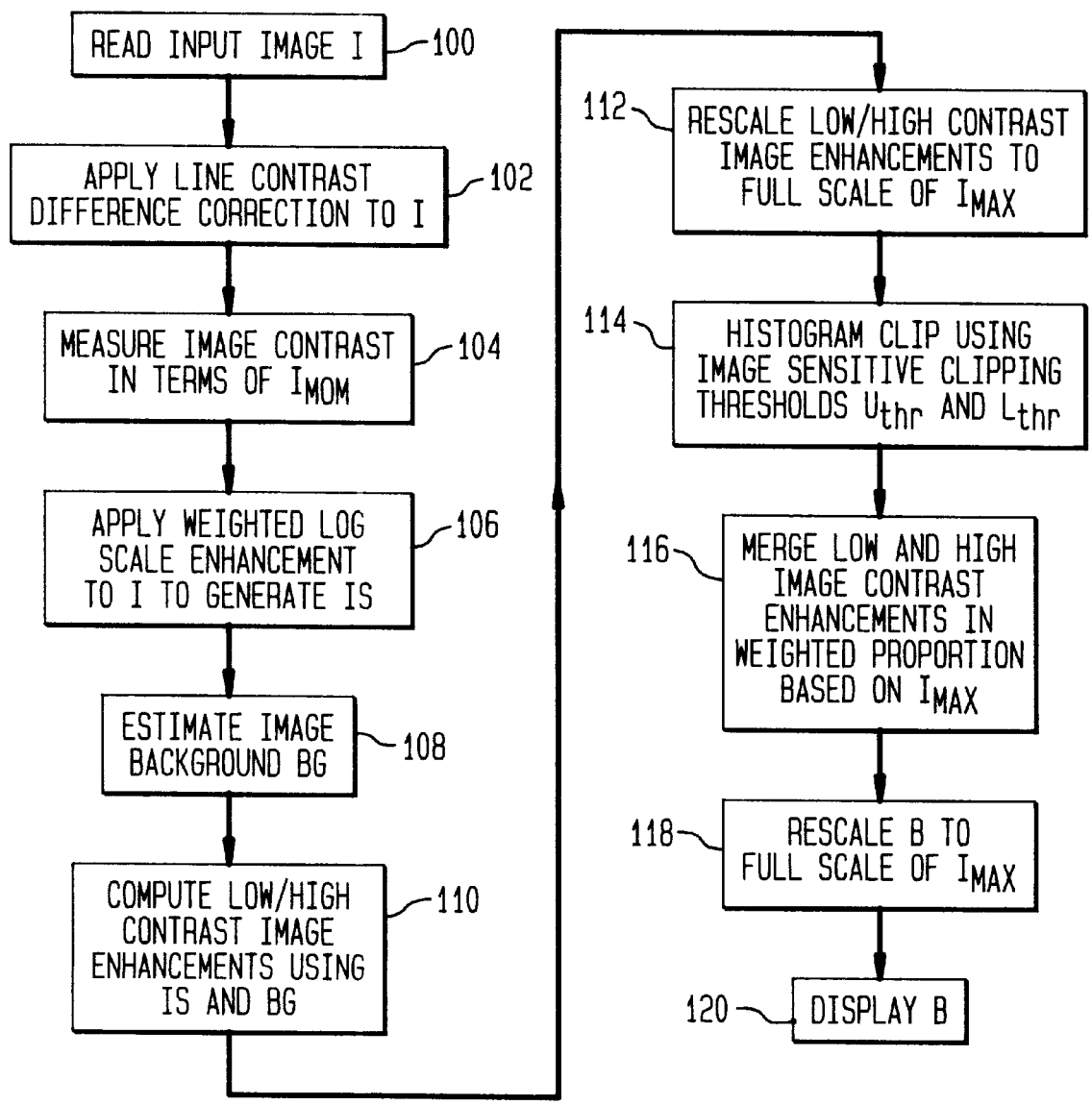
FIG. 2 is a flowchart depicting the process steps of the present invention.

The above problems are overcome by the method of the present invention which will now be described with the aid of FIGS. 1 and 2. In FIG. 1, a system 10 for carrying out the method of the present invention includes an imaging system 12 such as an LLS system, a processor 14 for implementing the automated image enhancement process, and a display device 16 for displaying the enhanced image. In FIG. 2, a flowchart is presented illustrating the stepwise procedure of the present invention.

At step 100, two dimensional image data is passed from imaging system 12 to processor 14. The two-dimensional image data is in the form of an intensity value I at each row i and column j position, i.e., a pixel. Accordingly, the image intensity at any pixel will be referred to herein as $I_{i,j}$.

Since the present invention is being described as it relates to LLS data, the present invention can apply a line contrast difference correction at step 102 to eliminate parallel lines that typically appear in an LLS image (i.e., image lines that are parallel to the sensor scanning direction). One line contrast difference correction is disclosed by this applicant in the above-noted co-pending patent application entitled "LINE CONTRAST DIFFERENCE EFFECT CORRECTION FOR LASER LINE SCAN DATA", the contents of which are hereby incorporated by reference.

Briefly, the co-pending application teaches that a one-dimensional Discrete Fourier Transform (DFT) is taken along each column of the input image I. The mean magnitudes of all the column DFTs along each row are then computed and a low pass filter is applied to each column DFT. The trouble frequencies (i.e., those frequencies which are associated with the line effect) are identified using a linear least squares error method applied to the mean magnitude of the column DFTs. For each column DFT, the coefficient corresponding to trouble frequencies is suppressed. The suppression is made proportional to the distance between the mean DFT magnitude and its least squares error estimate. Finally, the inverse one-dimensional DFT along each column is taken to reconstruct the image without the lines. Note that step 102 would not be required for conventional two-dimensional image data that is collected as a "snapshot" as opposed to being collected a line at a time as is the case with LLS data.

Unknown image contrast provides another obstacle to automated image enhancement. In terms of underwater imaging, the contrast of an image is directly proportional to the background of the ocean bottom (assuming shallow water imagery). For example, muddy bottoms tend to have dark backgrounds resulting in a low image contrast, while sandy bottoms tend to have brighter backgrounds resulting in a higher image contrast. This can be problematic for automated enhancement routines since most are contrast sensitive and are usually applicable to either high contrast or low contrast images, but not both. Hence, a contrast measure is introduced by the present invention at step 104 to help adjust various processing parameters in order to automatically control the image contrast.

The contrast measure chosen for image I is a central image histogram moment $I_{MOM}$ defined by $$I_{MOM} = \sum_{k=0}^{I_{MAX}} H(k) \times \left(k - \frac{1}{2} I_{MAX}\right) \quad (2)$$

where H(k) is the image histogram (i.e., the distribution of pixel intensity values found within the image I) and $I_{max}$ is the maximum value of the image dynamic range. This definition of moment is considered a central moment since the expected value of the image dynamic range is approximately $\frac{1}{2} I_{max}$. Note that the value range for $I_{mom}$ is $-I_{max}$ to $+I_{max}$. Using this definition of $I_{mom}$, large negative values (e.g., produced by muddy bottoms) indicate a strong need for contrast enhancement while large positive values (e.g., produced by sandy bottoms) indicate little or no need for contrast enhancement. Before computing the image histogram moment, the image is linearly stretched to full dynamic range to help accurately determine the image contrast. That is, the range of actual image values is linearly interpolated or stretched to span over the full dynamic range defined by $I_{MAX}$. The central histogram moment $I_{MOM}$ will be used in the present invention to adjust processing parameters in accordance with the environmental conditions of the image.

Once the image's contrast measure is determined at step 104, the image I must be scaled to enhance the low signal strength regions thereof without causing saturation of the high signal strength regions. To do this, the present invention applies a weighted scaling function at step 106 to each image pixel $I_{i,j}$ to generate a scaled image pixel $IS_{i,j}$ defined by $$IS_{i,j} = I_{max} \times Log_{10}[I_{i,j} \times (10^p - 1)/I_{max} + 1]/p \qquad (2)$$

$$p = p_{new} \times (I_{max} - I_{i,j})/I_{max} + 0.1 \qquad (3)$$

$$p_{new} = (\tfrac{1}{2} I_{mom})/(\tfrac{1}{2} I_{max}) + 0.1 \qquad (4)$$

The log scale routine of equation (2) includes a weighted power factor p that depends on the value of the image pixel $I_{i,j}$ and a new power factor $P_{new}$ that depends on the image contrast measure $I_{mom}$. Since $I_{mom}$ has a value range from $-I_{max}$ to $+I_{max}$, the value range for $P_{new}$ is from 0.1 to 2.1 where lower contrast images have values closer to 2.1 and higher contrast images have values closer to 0.1. Note that the additive constant 0.1 (used in equations (3) and (4)) is selected to be a small value greater than zero to prevent division by zero in the log scale equation.

The present invention applies stronger contrast enhancement for low contrast images (as in the case of muddy bottoms) and little or no contrast enhancement for high contrast images (as in the case of sandy bottoms). The power factor p gives a linear weight to the $P_{new}$ power factor, with full weight for $I_{i,j}=0$ and zero weight for $I_{i,j}=I_{max}$. This provides the greatest enhancement for low signal strength pixels and the weakest enhancement for the high signal strength pixels.

The next steps in the present invention use an estimate of the image background to provide both high contrast and low contrast image enhancements. While an image background is easily distinguished by human observation, the automated system of the present invention must make some sort of "best guess" of background in order to distinguish same from object pixels. Briefly, the background estimate BG is determined at step 108 by modeling the image's rows and columns with a linear least squares error routine using overlapping piecewise line segments. For example, piecewise line segments 256 pixels long could be used to estimate each image row. Each line segment is approximated with a least squares error estimate that is overlapped by 50% where line segments connect. For instance, the last 128 pixels of one line segment are linearly merged with the first 128 pixels of the subsequent line segment. This process is repeated for each image column so that the resulting background estimate BG is a two-dimensional array $BG_{i,j}$.

Low and high contrast image enhancements are then determined on a pixel-by-pixel basis at step 110. The low contrast enhancement $L_{i,j}$ is determined by subtracting the background estimate $BG_{i,j}$ from the scaled image pixel $IS_{i,j}$ or $$L_{i,j} = IS_{i,j} - BG_{i,j} \qquad (5)$$

The high contrast image enhancement $H_{i,j}$ is determined by adding the background estimate $BG_{i,j}$ to the scaled image pixel $IS_{i,j}$ or $$H_{i,j} = IS_{i,j} + BG_{i,j} \qquad (6)$$

For best image resolution, the low and high contrast image enhancements $L_{i,j}$ and $H_{i,j}$, respectively, should be linearly stretched at step 112 to the full dynamic range defined by $I_{MAX}$.

Once rescaled to the full dynamic range, it is typically necessary to apply histogram clipping to both $L_{i,j}$ and $H_{i,j}$. Histogram clipping is very useful for removing noise pixels that can reduce the quality of an image by suppressing its dynamic range. For LLS data, however, some objects are found to be very reflective producing image pixels that lie in the upper portions of the image dynamic range while some objects are very absorptive producing image pixels that lie in the lower portions of the image dynamic range. This makes it difficult to apply a fixed histogram clipping since clipping thresholds too small will be ineffective in reducing noise, but clipping thresholds too large can cause saturation. This problem occurs mostly for dark background images with reflective objects and bright background images with absorptive objects. To help circumvent this problem, the present invention applies a histogram clipping routine that incorporates clipping thresholds as a function of the image moment $I_{MOM}$. This is accomplished by using image sensitive clipping thresholds at step 114. The image sensitive clipping thresholds are defined as $$U_{thr} = 0.005 \, [1 - I_{mom}/(I_{max})] \qquad (7)$$

$$L_{thr} = 0.005 \, [1 + I_{mom}/(I_{max})] \qquad (8)$$

where $U_{thr}$ and $L_{thr}$ are the upper and lower histogram clipping thresholds, respectively. Note that the value range of both $U_{thr}$ and $L_{thr}$ is from 0.0 to 0.01, and that $U_{thr} + L_{thr} = 0.01$ (or 1%). Using this histogram clipping routine is similar to a 1% histogram clip routine except the thresholds at each end of the dynamic range, instead of being equal values, are weighted as a function of image contrast. With these thresholds, low contrast images have larger thresholds at the low end of the image dynamic range and smaller thresholds at the upper end. High contrast images have larger thresholds at the upper end of the image dynamic range and smaller thresholds at the lower end. This helps to reduce saturation while still maintaining improved image quality through histogram clipping.

At step 116, the low contrast enhancement $L_{i,j}$ is merged with the high contrast enhancement $H_{i,j}$ in order to provide an overall background enhanced image $B_{i,j}$. In general, the idea is to enhance low signal strength regions while preserving high contrast objects, but not to equalize the high/low strength regions. This is achieved by merging the high contrast enhancement with the low contrast enhancement in a weighted fashion to provide $B_{i,j}$. Specifically, $$B_{i,j} = (w \times H_{i,j}) + [(1-w) \times L_{i,j}] \qquad (9)$$

where the weighting factor w is defined as $$w = (I_{i,j}/I_{max})^q \qquad (10)$$

where $$q = 3 \times [(I_{max} - I_{i,j})I_{max}] + 1 \qquad (11)$$

Since enhancement of low signal strength regions is the primary concern, equation (9) is heavily weighted towards low contrast enhancement. For example, if $I_{i,j}=0$, $B_{i,j}=L_{i,j}$. However, even if $I_{i,j}=\tfrac{1}{2}I_{MAX}$, the overall background enhanced image $B_{i,j}$ is still heavily weighted towards low contrast enhancement as $B_{i,j}=(0.167)H_{i,j}+(0.833)L_{i,j}$. A balanced weighting of $H_{i,j}$ and $L_{i,j}$ is utilized when $I_{i,j}=(0.696) I_{MAX}$. For best image resolution, the overall background enhanced image B should be linearly stretched at step 118 to the full dynamic range defined by $I_{MAX}$ before being displayed at step 120.

The advantages of the present invention are numerous. The image enhancement method operates without user inputs and is independent of environmental conditions. Further, the method reduces the smudge effect sometimes associated with the imaging of high contrast objects. The present invention will be of great use with underwater images produced using a laser line scan system. However, the method can also be applied to any image data subject to image contrast fluctuations.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described. What is claimed as new and desired to be secured by Letters Patent of the United States is:

What is claimed is:

1. A method of producing an enhanced image, comprising the steps of:

providing image intensity at each pixel of an image;

measuring contrast of said image by computing a central histogram moment $I_{MOM}$ wherein $$I_{MOM} = \sum_{k=0}^{I_{MAX}} H(k) \times \left(k - \frac{1}{2}I_{MAX}\right)$$

where H(k) is an image histogram of said image and $I_{MAX}$ is a maximum value of the dynamic range of said image;

scaling said image at each said pixel thereof based on said central histogram moment $I_{MOM}$ and said maximum value $I_{MAX}$ wherein a scaled image is defined at each said pixel;

estimating a background of said image at each said pixel thereof;

subtracting said background from said scaled image at each said pixel to produce a low contrast enhancement value associated with each said pixel of said image;

adding said background to said scaled image at each said pixel to produce a high contrast enhancement value associated with each said pixel of said image; and summing, for each said pixel of said image, a first portion of said low contrast enhancement value with a second portion of said high contrast enhancement value to generate an enhanced image intensity at each said pixel.

2. A method according to claim 1 wherein said image is a two-dimensional image having i rows and j columns, and wherein said scaled image is defined as $$I_{max} \times \text{Log}_{10}[I_{i,j} \times (10^p - 1)/I_{max} + 1]/p$$

where $I_{i,j}$ is said image intensity at an i-th row, j-th column pixel of said image and p is a non-zero weighted power factor.

3. A method according to claim 2 wherein said non-zero weighted power factor p is based on said central histogram moment $I_{MOM}$ and said maximum value $I_{MAX}$.

4. A method according to claim 3 wherein said non-zero weighted power factor p is $$p = p_{new} \times (I_{max} - I_{i,j})/I_{max} + 0.1$$

and $$p_{new} = (\tfrac{1}{2}I_{max} - I_{mom})/(\tfrac{1}{2}I_{max}) + 0.1.$$

5. A method according to claim 1 wherein said image is a two-dimensional image having i rows and j columns, and wherein said step of estimating comprises the step of modeling said i rows and said j columns of said image using a least squares error routine.

6. A method according to claim 1 wherein the value of said first portion plus the value of said second portion is equal to one.

7. A method according to claim 1 wherein the value of said first portion is greater than the value of said second portion.

8. A method according to claim 1 wherein said image is a two-dimensional image having i rows and j columns, and wherein the value of said first portion is defined as $$w = (I_{i,j}/I_{max})^q$$

where $I_{i,j}$ is said image intensity at an i-th row, j-th column pixel of said image and $$q = 3 \times [(I_{max} - I_{i,j})/I_{max}] + 1.$$

9. A method according to claim 1 further comprising the steps of:

generating said image using a laser line scan system; and applying a line contrast difference correction to said image prior to said step of measuring.

10. A method according to claim 1 further comprising the step of rescaling said high contrast enhancement value and said low contrast enhancement value over the dynamic range of said image defined by said maximum value $I_{MAX}$.

11. A method according to claim 10 further comprising the step of applying a histogram clipping routine to said high contrast enhancement value and said low contrast enhancement value based on said central histogram moment $I_{MOM}$ and said maximum value $I_{MAX}$.

12. A method according to claim 11 wherein said histogram clipping routine has an upper threshold $U_{thr}$ defined as $$U_{thr} = 0.005 \, [1 - I_{mom}/(I_{max})]$$

and a lower threshold $L_{thr}$ defined as $$L_{thr} = 0.005 \, [1 + I_{mom}/(I_{max})].$$

13. A method according to claim 1 further comprising the step of rescaling said enhanced image intensity over the dynamic range of said image defined by said maximum value $I_{MAX}$.

14. A method of producing an enhanced image, comprising the steps of:

providing image intensity I at each pixel of a two-dimensional image having i rows and j columns, wherein $I_{i,j}$ is said image intensity at an i-th row, j-th column pixel of said image;

measuring contrast of said image by computing a central histogram moment $I_{MOM}$ wherein $$I_{MOM} = \sum_{k=0}^{I_{MAX}} H(k) \times \left(k - \frac{1}{2} I_{MAX}\right)$$

where H(k) is an image histogram of said image and $I_{MAX}$ is a maximum value of the dynamic range of said image;

scaling said image at each said pixel thereof wherein a scaled image IS is defined at each i-th row, j-th column pixel as $$IS_{i,j} = I_{max} \times Log_{10}[I_{i,j} \times (10^p - 1)/I_{max} + 1]/p$$

where p is a non-zero weighted power factor based on said central histogram moment $I_{MOM}$ and said maximum value $I_{MAX}$;

estimating a background of said image at each said pixel thereof;

subtracting said background from said scaled image at each said pixel to produce a low contrast enhancement value $L_{i,j}$ associated with each said pixel of said image;

adding said background to said scaled image at each said pixel to produce a high contrast enhancement value $H_{i,j}$ associated with each said pixel of said image; and generating, for each said pixel of said image, an enhanced image intensity at each said pixel in accordance with $$(w \times H_{i,j}) + [(1-w) \times L_{i,j}]$$

where $$w = (I_{i,j}/I_{max})^q$$

and $$q = 3 \times [(I_{max} - I_{i,j})/I_{max}] + 1.$$

15. A method according to claim 14 wherein said non-zero weighted power factor p is $$p = p_{new} \times (I_{max} - I_{i,j})/I_{max} + 0.1$$

and $$p_{new} = (\tfrac{1}{2}I_{max} - I_{mom})/(\tfrac{1}{2}I_{max}) + 0.1.$$

16. A method according to claim 14 wherein said step of estimating comprises the step of modeling said i rows and said j columns of said image using a least squares error routine.

17. A method according to claim 14 wherein the value of said first portion is greater than the value of said second portion.

18. A method according to claim 14 further comprising the steps of:

generating said image using a laser line scan system; and applying a line contrast difference correction to said image prior to said step of measuring.

19. A method according to claim 14 further comprising the step of rescaling said high contrast enhancement value and said low contrast enhancement value over the dynamic range of said image defined by said maximum value $I_{MAX}$.

20. A method according to claim 19 further comprising the step of applying a histogram clipping routine to said high contrast enhancement value and said low contrast enhancement value based on said central histogram moment $I_{MOM}$ and said maximum value $I_{MAX}$.

21. A method according to claim 20 wherein said histogram clipping routine has an upper threshold $U_{thr}$ defined as $$U_{thr} = 0.005 [1 - I_{mom}/(I_{max})]$$

and a lower threshold $L_{thr}$ defined as $$L_{thr} = 0.005 [1 + I_{mom}/(I_{max})].$$

22. A method according to claim 14 further comprising the step of rescaling said enhanced image intensity over the dynamic range of said image defined by said maximum value $I_{MAX}$.

\* \* \* \* \*